US007370805B2

(12) United States Patent
Smith et al.

(10) Patent No.: US 7,370,805 B2
(45) Date of Patent: May 13, 2008

(54) TRANSACTION CARD COMPRISING TWO MAGNETIC STRIPES

(75) Inventors: Merrill Brooks Smith, Atlanta, GA (US); Sean Keith Chariker, Alpharetta, GA (US)

(73) Assignee: e2Interactive, Inc., Atlanta, GA (US)

(*) Notice: Subject to any disclaimer, the term of this patent is extended or adjusted under 35 U.S.C. 154(b) by 82 days.

(21) Appl. No.: 10/835,320

(22) Filed: Apr. 30, 2004

(65) Prior Publication Data

US 2005/0242193 A1 Nov. 3, 2005

(51) Int. Cl.
*G06K 19/00* (2006.01)

(52) U.S. Cl. .......................................... 235/487; 235/383

(58) Field of Classification Search ................ 235/487, 235/492, 383, 385, 486, 449

See application file for complete search history.

(56) References Cited

U.S. PATENT DOCUMENTS

| | | | | |
|---|---|---|---|---|
| 4,609,812 | A | 9/1986 | Drexler | |
| 4,645,916 | A * | 2/1987 | Raisleger | 235/494 |
| 4,806,740 | A | 2/1989 | Gold et al. | |
| 5,326,964 | A | 7/1994 | Risser | |
| 5,434,404 | A * | 7/1995 | Liu et al. | 235/475 |
| 5,777,305 | A * | 7/1998 | Smith et al. | 235/380 |
| 5,883,377 | A | 3/1999 | Chapin, Jr. | |
| 5,918,909 | A * | 7/1999 | Fiala et al. | 283/61 |
| 6,138,917 | A | 10/2000 | Chapin, Jr. | |
| 6,202,933 | B1 | 3/2001 | Poore et al. | |
| 6,473,500 | B1 * | 10/2002 | Risafi et al. | 379/144.01 |
| 6,588,658 | B1 | 7/2003 | Blank | |
| 2002/0040935 | A1 | 4/2002 | Weyant | |
| 2003/0057280 | A1 | 3/2003 | Mandile | |
| 2003/0069846 | A1 | 4/2003 | Marcon | |
| 2003/0150762 | A1 * | 8/2003 | Biller | 206/461 |
| 2003/0205616 | A1 | 11/2003 | Graves et al. | |
| 2005/0061889 | A1 * | 3/2005 | McGee et al. | 235/487 |
| 2005/0205663 | A1 * | 9/2005 | Algiene | 235/380 |
| 2005/0205665 | A1 * | 9/2005 | Lasch et al. | 235/380 |

FOREIGN PATENT DOCUMENTS

| | | | |
|---|---|---|---|
| CA | 2 303 827 | A1 | 9/2001 |
| DE | 299 24 565 | U1 | 11/2003 |
| GB | 2 281 714 | A | 3/1995 |

OTHER PUBLICATIONS

European Search Report, Application No. EP 05 10 3392, Dec. 9, 2005, 3 pages.

* cited by examiner

*Primary Examiner*—Daniel Stcyr
(74) *Attorney, Agent, or Firm*—Hunton & Williams LLP

(57) ABSTRACT

An apparatus and method for activating and using a transaction card comprising two storage media is provided. A composite transaction card comprises a transaction portion detachably coupled to an activation portion. The transaction portion comprises a substantially planar transaction portion substrate having a machine readable transaction storage medium applied thereto. The transaction storage medium has transaction card data associated with an account stored therein. The activation portion comprises a substantially planar activation portion substrate having a machine readable activation storage medium applied thereto. The activation storage medium has activation data associated with the account stored therein.

33 Claims, 11 Drawing Sheets

FIG. 1A
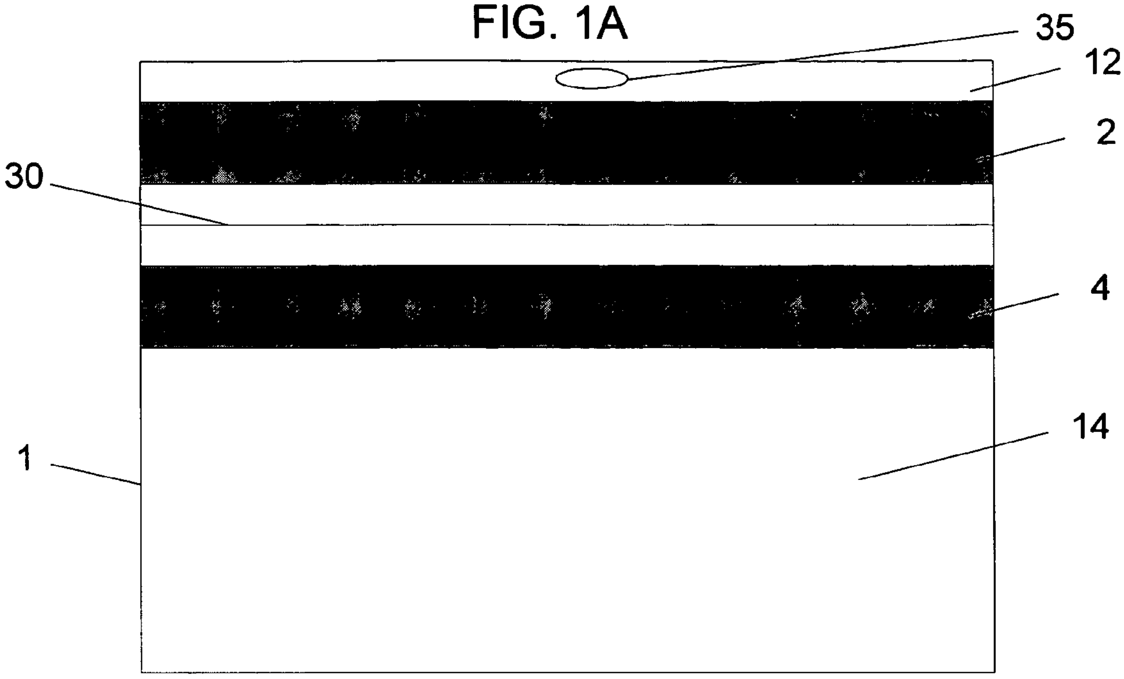
FIG. 1B
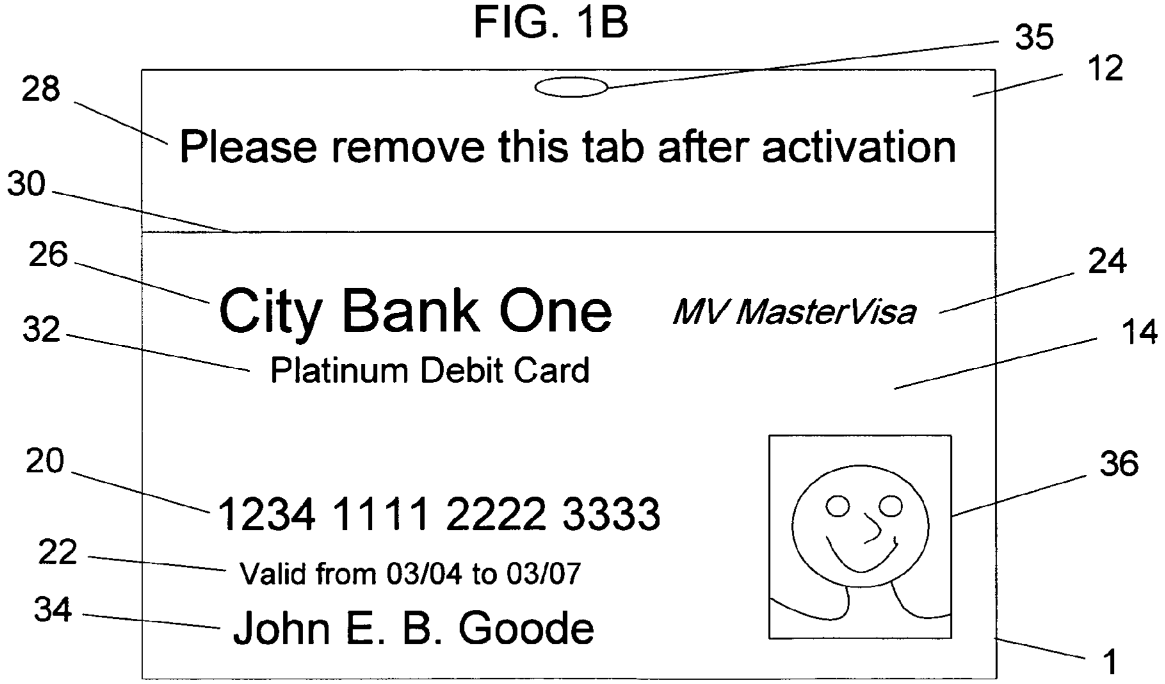
FIG. 1

FIG. 3A
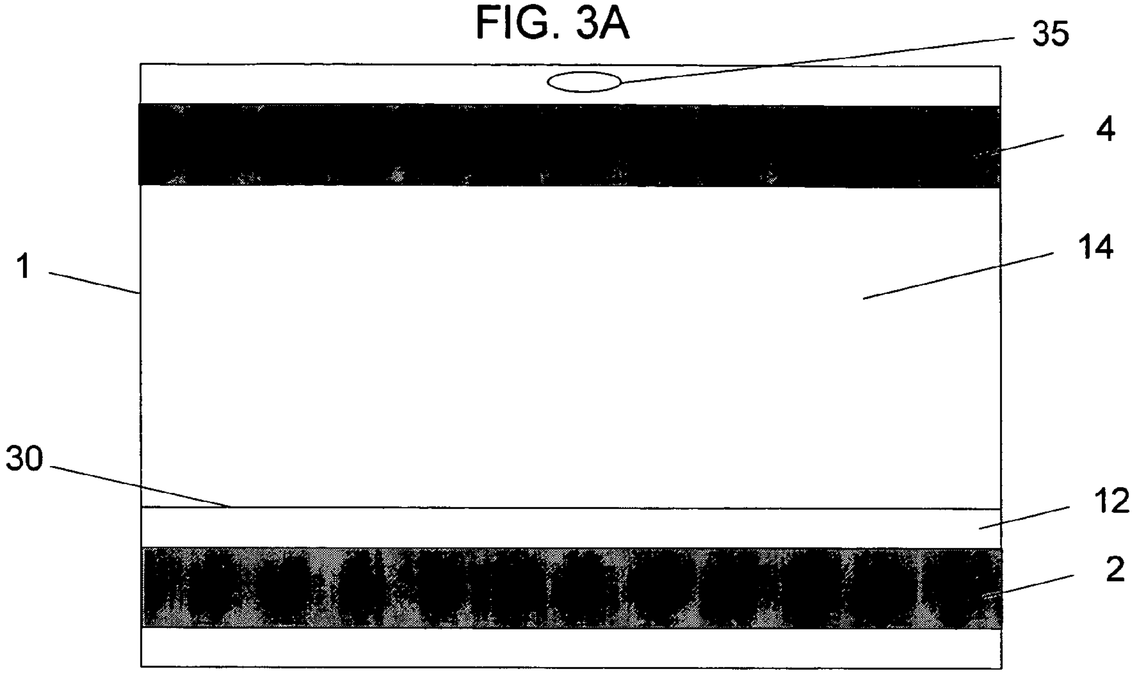
FIG. 3B
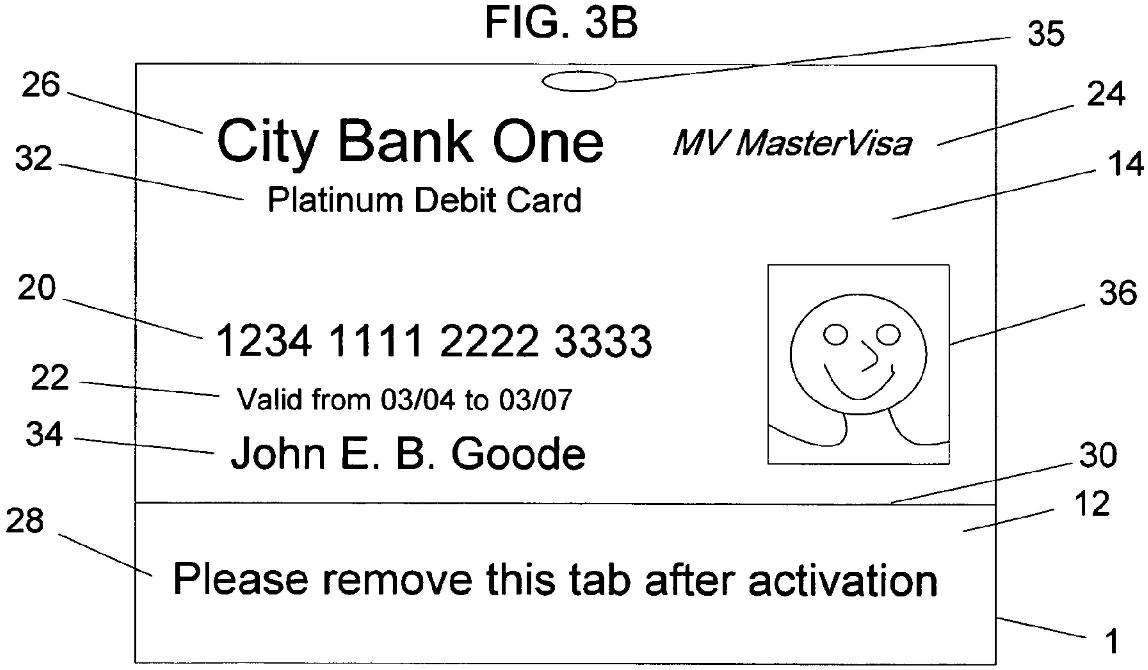
FIG. 3

FIG. 4A
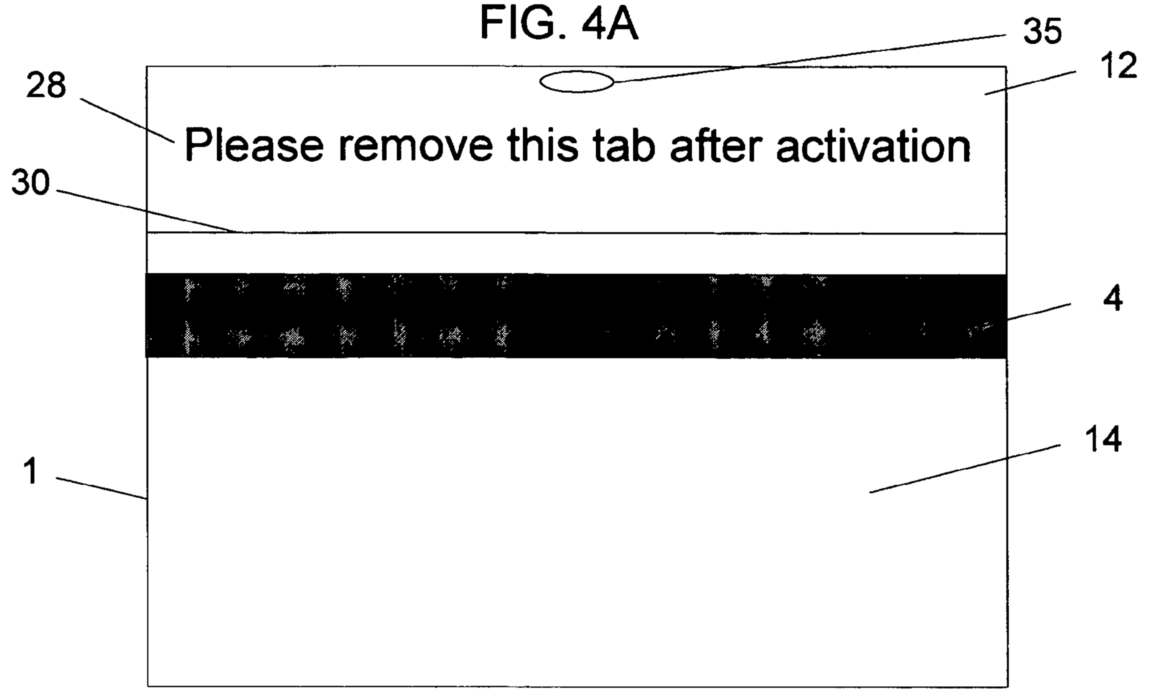
FIG. 4B
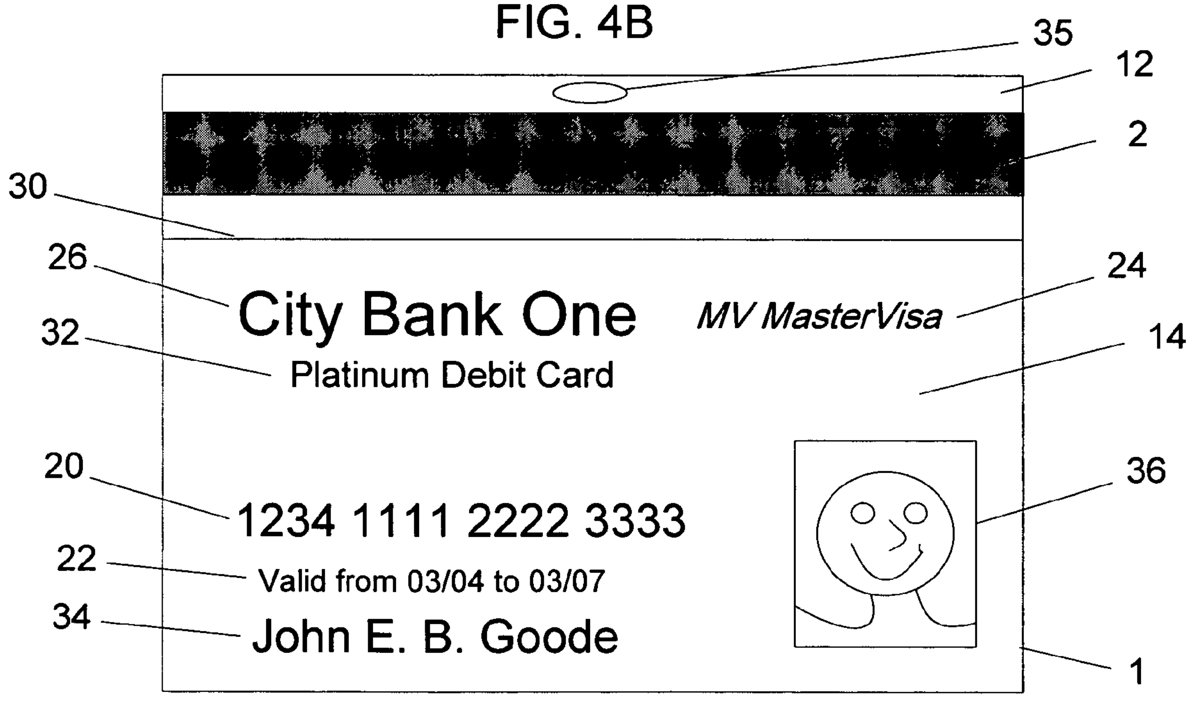
FIG. 4

FIG. 5A
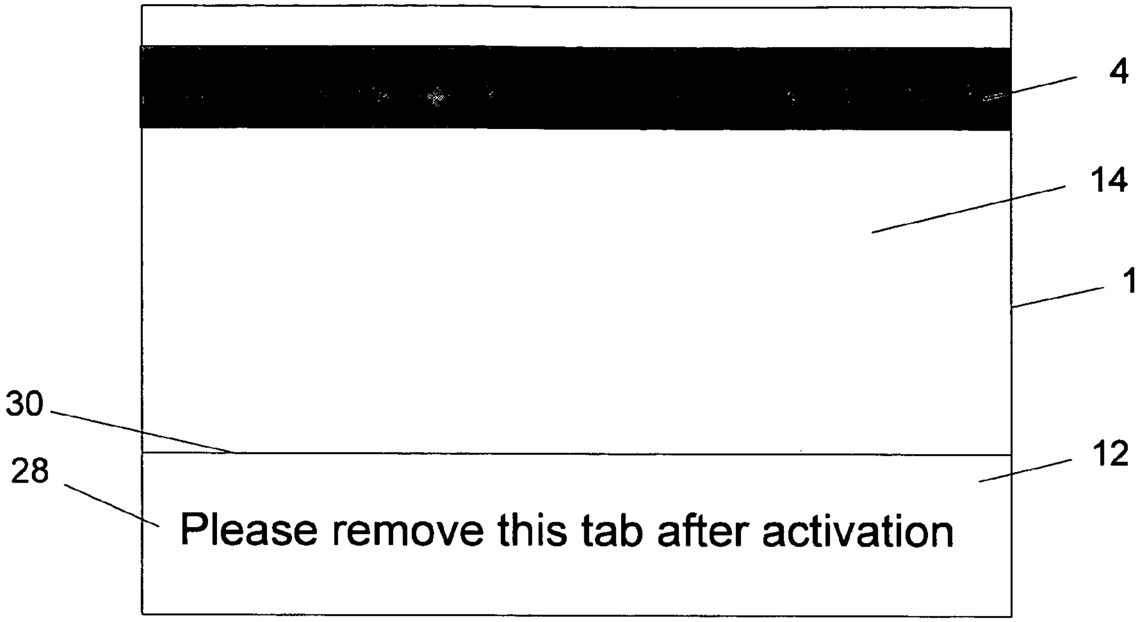
FIG. 5B
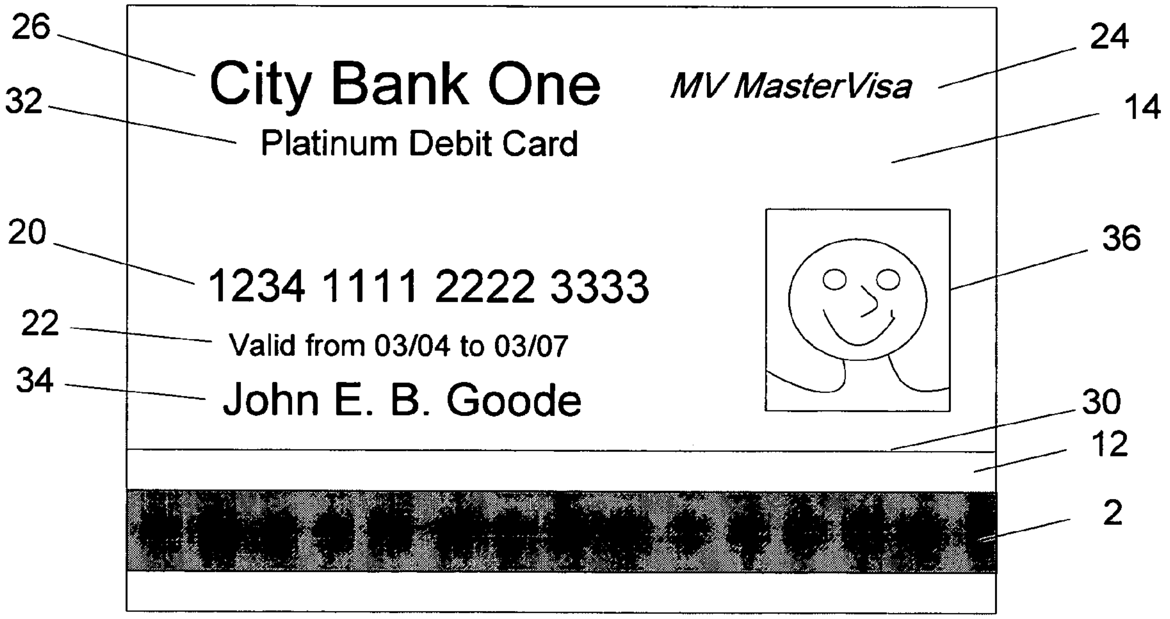
FIG. 5

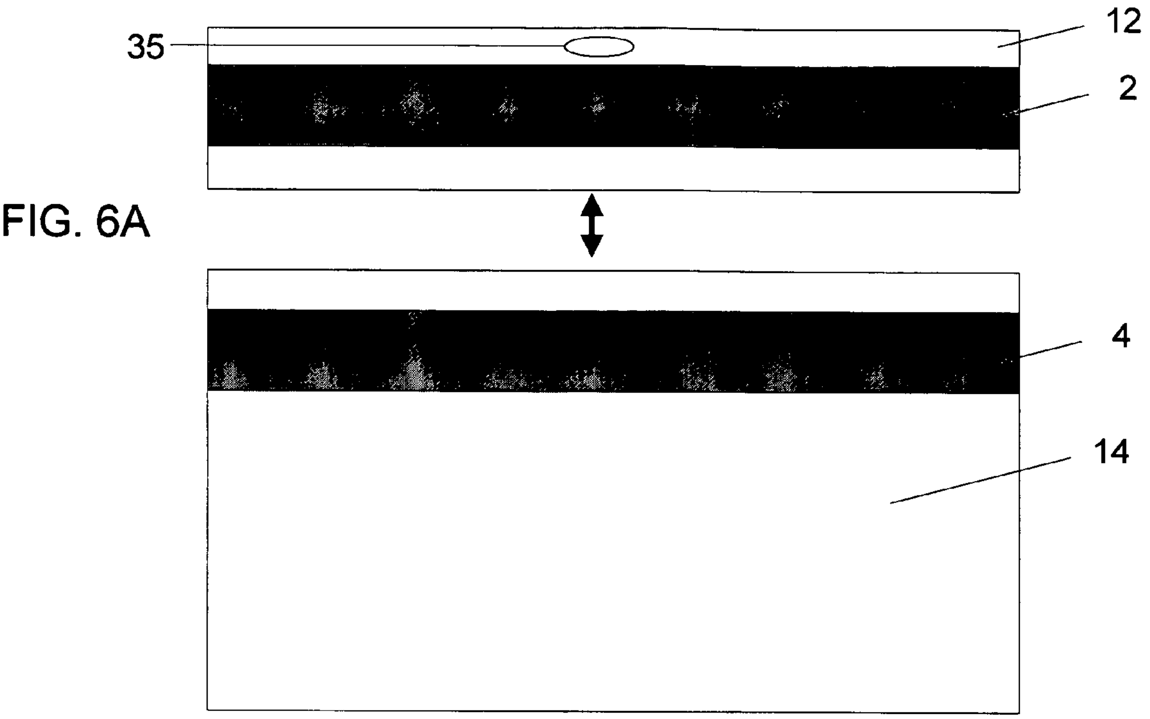
FIG. 6A
FIG. 6B
FIG. 6

FIG. 7A
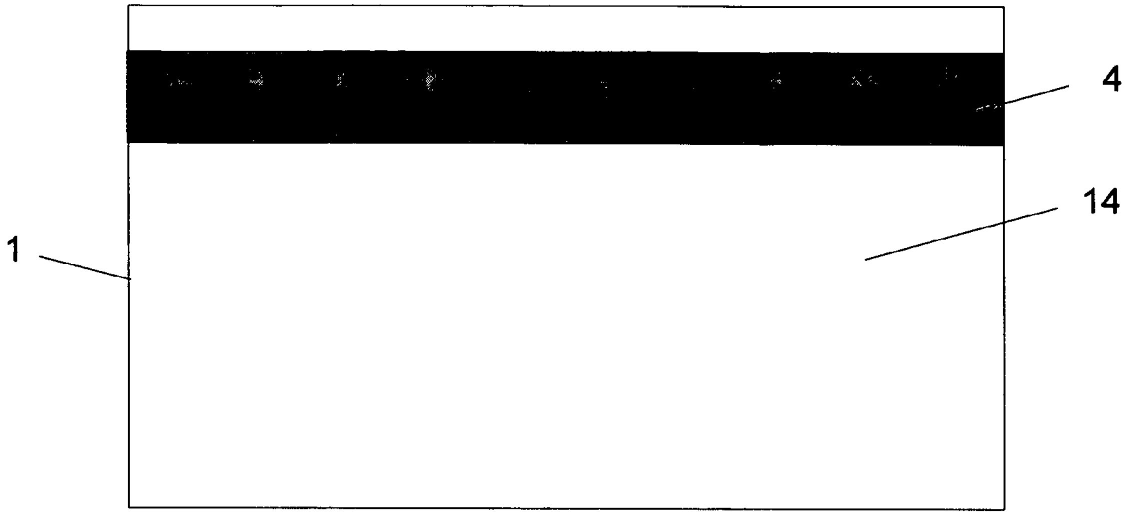
FIG. 7B
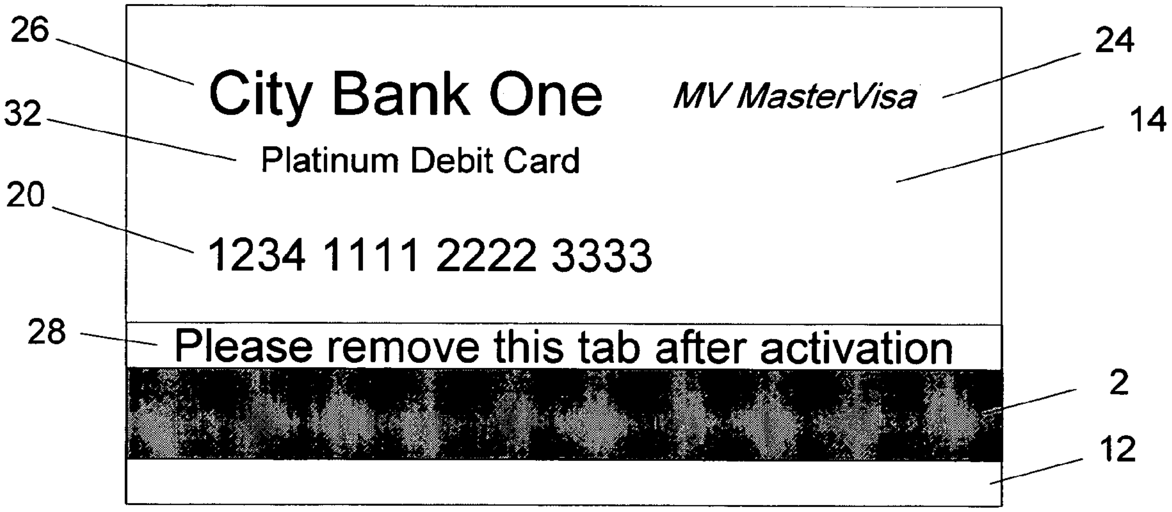
FIG. 7

TRANSACTION CARD COMPRISING TWO MAGNETIC STRIPES

FIELD OF THE INVENTION

This invention relates to transaction cards. More particularly, the invention relates to a composite card comprising a transaction portion coupled to an activation portion, where the transaction portion and activation portion each comprise a storage medium.

BACKGROUND OF THE INVENTION

To prevent fraud and theft, transaction cards such as credit cards, debit cards, and stored value cards may be issued in an inactive state, where the card must be activated prior to use. A separate activation step can serve at least two important goals. First, it can ensure that the card is in the possession of the rightful cardholder. For instance, cards may be activated when the rightful cardholder verifies receipt, such as by accessing a central processor (e.g., via phone) and providing personal identification information. Second, activation can ensure that the card has been validly purchased for legitimate value (and not stolen). For instance, a prepaid card may be activated at the time it is purchased for valid funds, e.g., by scanning a barcode on a package that contains the card at a point of sale and receiving payment for the card.

After activation, transaction cards may be used to purchase goods and services from merchants. Most transaction cards such as credit cards, debit cards, and stored value cards have a single magnetic stripe that stores magnetically encoded data associated with an account. The magnetic stripe is swiped at merchant terminals in transactions where cardholders access value or credit in the account to purchase goods and services. Typically the magnetic stripe is encoded with data that enables transactions where card account funds are accessed over a communications network such as a credit or debit network. For instance, the encoded data may comprise a bank identification number (BIN) and an account identifier, such as the card number. While the data encoded on the magnetic stripe enables transactions, it typically is not configured to enable card activation at merchants outside the issuing merchant locations. Thus, activation is typically accomplished using means other than the card's single magnetic stripe. As noted above, a card may be activated over the phone or by scanning the barcode of a package containing the card.

Other cards may be activated by swiping the card's magnetic stripe. However, for these cards, the magnetic stripe encoding is required to be the same for activation and regular use of the card. This is typically not an issue when a single merchant's system handles both the activation and the regular use of the card. However, problems may arise when two different systems are involved, because the different systems must coordinate the activation of the card before enabling its regular use.

The magnetic stripe is encoded only for activation purposes, and the regular functioning of the card does not require a magnetic stripe. For instance, phone cards may display a PIN used for wireless phone calls that is activated by swiping a magnetic stripe on the card; thereafter, the magnetic stripe is not needed to access the value of the PIN.

Another type of transaction card has two or more magnetic stripes on a single, standard-size transaction card. The two or more magnetic stripes may be used to access two different transaction accounts. In this way, a cardholder may carry a single transaction card instead of two different credit cards or other transaction cards.

SUMMARY OF THE INVENTION

In one exemplary embodiment, an apparatus and method for activating and using a transaction card comprising two storage media is provided. A composite transaction card comprises a transaction portion detachably coupled to an activation portion. The transaction portion comprises a substantially planar transaction portion substrate having a machine readable transaction storage medium applied thereto. The transaction storage medium has transaction card data associated with an account stored therein. The activation portion comprises a substantially planar activation portion substrate having a machine readable activation storage medium applied thereto. The activation storage medium has activation data associated with the account stored therein.

In another exemplary embodiment, a method of using a composite transaction card is provided. The transaction card has a transaction portion including a machine readable transaction storage medium and a detachable activation portion including a machine readable activation storage medium. The transaction storage medium has transaction card data associated with an account stored therein. The activation storage medium has activation data associated with the account stored therein. According to the method, activation data is read from the activation storage medium at a first merchant terminal. The activation portion is detached from the transaction portion. The transaction portion may not be accessed until the activation portion is removed. The transaction data is read from the transaction storage medium at a second merchant terminal.

In another exemplary embodiment, a system for processing a composite transaction card is provided. The transaction card has a transaction portion including a machine readable transaction storage medium and a detachable activation portion including a machine readable activation storage medium. The transaction storage medium has transaction card data associated with an account stored therein. The activation storage medium has activation data associated with the account stored therein. The system comprises at least one merchant terminal for reading the activation data from the activation storage medium and for reading transaction card data from the transaction storage medium.

According to another embodiment, a method of using a transaction card device is provided. Activation account information is received from an activation portion of a transaction card during a first transaction associated with an activation account. The transaction card comprises a transaction portion coupled to the activation portion. The transaction portion comprising a substantially planar transaction portion substrate having a machine readable transaction storage medium applied thereto. The transaction storage medium has transaction card data associated with a transaction account stored therein. The activation portion is detachably coupled to the transaction portion. The activation portion comprises a substantially planar activation portion substrate having a machine readable activation storage medium applied thereto. Based on the first transaction, value is added to the transaction account. Transaction card data is received from the transaction portion during a second transaction.

According to another embodiment, a method of printing a composite transaction card is provided. Activation data operative to activate a composite transaction card is received. The composite transaction card comprises an activation storage medium and a transaction storage medium. Transaction data operative to enable one or more transactions for the composite transaction card is received. The activation data and the transaction data are passed to a composite transaction card printer. The composite transaction card printer is configured to encode the activation data and the transaction data on the activation storage medium and the transaction storage medium, respectively.

According to another embodiment, a method of printing a composite transaction card is provided. Activation data operative to activate a composite transaction card and transaction data operative to enable one or more transactions for the composite transaction card are received. The composite transaction card comprises an activation storage medium and a transaction storage medium. The activation data and the transaction data are encoded on the activation storage medium and the transaction storage medium, respectively.

According to another embodiment, a composite transaction card is provided. A first portion comprises a substantially planar substrate having a first machine readable storage medium applied thereto. The first storage medium has first card data associated with an account stored therein. A second portion is detachably coupled to the first portion, and it comprises a substantially planar substrate having a second machine readable storage medium applied thereto. The second storage medium has second card data associated with the account stored therein.

Other embodiments could be considered.

BRIEF DESCRIPTION OF THE DRAWINGS

FIG. 1A and FIG. 1B illustrate a front and back view of a composite card according to an embodiment of the invention.

FIG. 3A and FIG. 3B illustrate a front and back view of a composite card according to another embodiment of the invention.

FIG. 4A and FIG. 4B illustrate a front and back view of a composite card according to another embodiment of the invention.

FIG. 5A and FIG. 5B illustrate a front and back view of a composite card according to another embodiment of the invention.

FIG. 6A and FIG. 6B illustrate a front and back view of the detached components of the composite card according to another embodiment of the invention.

FIG. 7A and FIG. 7B illustrate a front and back view of a composite card according to another embodiment of the invention.

DETAILED DESCRIPTION OF THE EMBODIMENTS

Figure 2:
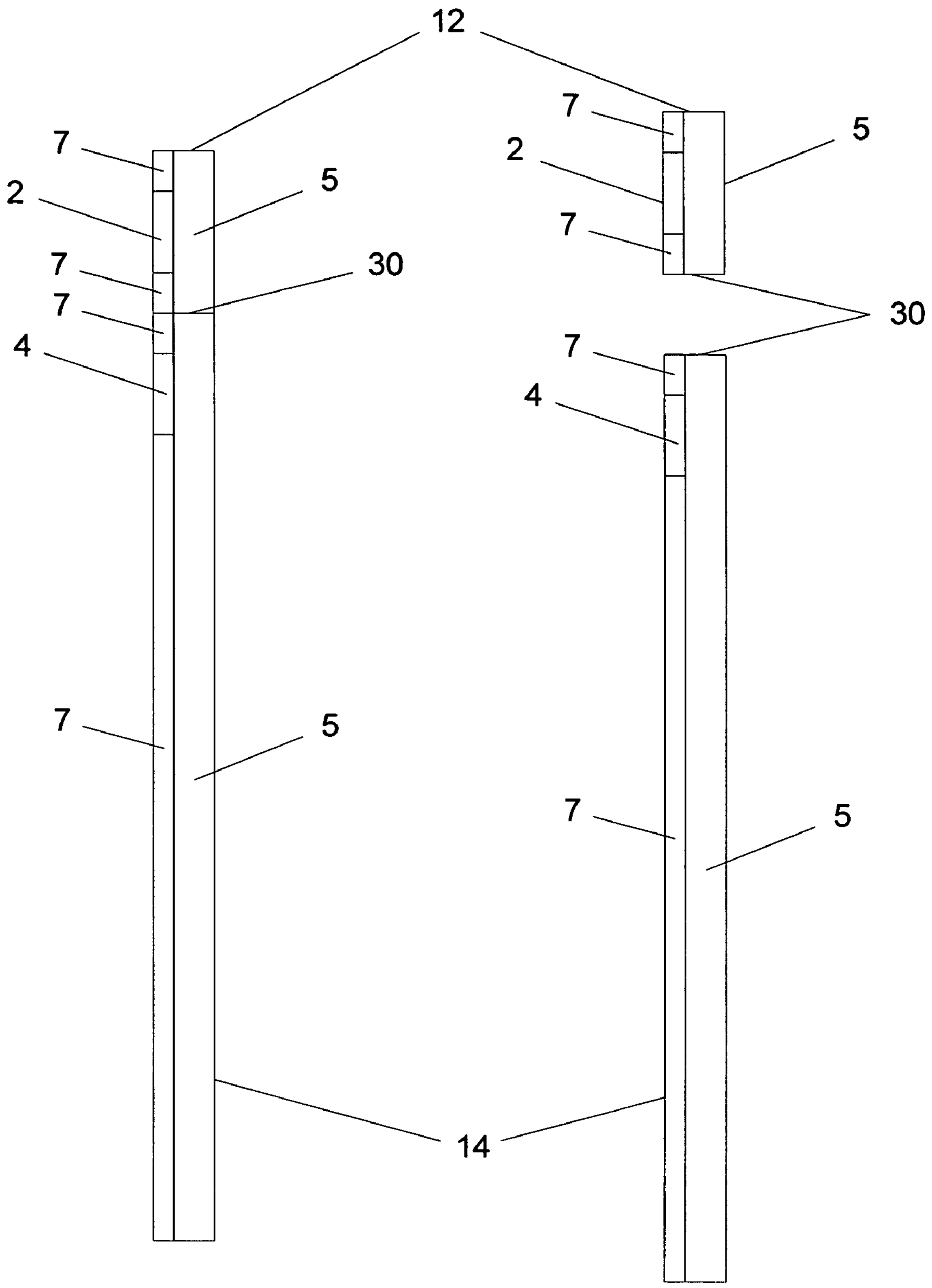
FIG. 2 shows a side view of a composite card according to another embodiment of the invention.

Accordingly, some embodiments of the invention provide a transaction card comprising a transaction portion coupled to an activation portion. The activation portion may comprise an activation storage medium storing activation data for activating the card at a merchant terminal. The transaction portion may comprise a standard credit, debit, stored value, or other transaction card, and it may comprise a card number and magnetic stripe storing transaction data for effecting transactions at merchant terminals. The activation portion may be detached from the transaction portion. In some embodiments, the activation portion may be required to be detached prior to using the transaction portion, or vice versa.

Alternately, the activation portion may be associated with a transaction account (such as a one-time use account), whereby using the activation portion in one or more transactions affects an account associated with the transaction portion. For instance, using the activation portion in a transaction may activate or allow activation of the transaction portion or may add value to an account associated with the transaction portion.

FIG. 1 illustrates a composite card 1 according to an embodiment of the invention. The composite card 1 may comprise a transaction portion 14 and an activation portion 12. FIG. 1A shows one face (such as the front face) of the composite card 1, and FIG. 1B shows the other face (such as the back face) of the card 1.

The transaction portion 14 (and in some embodiments, the activation portion 12) may be any standard card used for transactions, such as a credit, debit, stored value, or other card. The portions 12, 14 may have various indicia. The portions 12, 14 may comprise issuer indicia 26 such as the issuer name. The portions 12, 14 may also comprise card name or card type indicia 32, such as indicia indicating that the portion 12 or 14 is a Platinum Rewards card (or Gold card, debit card, gift card, or other type of card). The portions 12, 14 may have validity indicia 22, such as indicia indicating the dates of validity or an expiration date. The portions 12, 14 may have a card number 20 or other identifying indicia printed on the portions 12, 14. The card number 20 may be a 16-19 digit account number (or another number) and may comprise a BIN. In some embodiments, the portions 12, 14 may have a hang hole 35, e.g., for hanging the card on a J-hook or for otherwise hanging or storing the card in a store or other storage facility. In some embodiments, the card 1 may have a cardholder name 34 and/or a picture of the cardholder 36. The name and/or picture may be added to the portions 12, 14 at a time of purchase (or after); e.g., a customer may purchase a card 1, and the customer's name and picture may be printed on or otherwise added to the card 1 during or after purchase. Any or all of the indicia on the composite card 1 may be printed (e.g., embossed in raised lettering/numbering), stored, encoded, or otherwise marked on either the transaction portion 14 or the activation portion 12.

As will be discussed in more detail below, the composite card 1 may comprise a transaction storage medium 4 which may be applied to a surface of the transaction portion 14. The transaction storage medium 4 may comprise any storage medium, e.g., a machine-readable storage medium such as a magnetic stripe or barcode. The composite card 1 may also include an activation storage medium 2 which may be applied to a surface of the activation portion 12. The activation storage medium 2 may also comprise any storage medium, e.g., a machine readable medium such as a magnetic stripe or barcode.

As shown in FIG. 1A, the activation portion 12 may comprise a first machine readable storage medium 2, and the transaction portion 14 may comprise a transaction storage medium 4. The activation and transaction storage media 2, 4 may be the same or similar to those used in credit, debit, phone, or other transaction cards well-known in the art. For instance, the transaction portion 14 may comprise one or more read-only magnetically encoded stripes (referred to hereafter as "magnetic stripes") encoding different data in accordance with standard data encryption protocols readable by conventional transaction card reading systems.

The activation storage medium 2 may have activation data stored therein, the activation data comprising activation information. For instance, the activation data may be usable to activate the transaction portion 14 and/or an account associated with the card. For instance, the activation data may be activation information similar to that used to activate traditional phone cards or PINs, as well known in the art. The activation data may alternately (or in addition) comprise other transaction or account data, such as an account number, BIN, PIN, and/or other data. The activation data may be any type of data as that disclosed for the transaction data; similarly, the transaction data may be any type of data as disclosed for the activation data. In some embodiments, the activation data and transaction data may be identical.

The transaction storage medium 4 on the transaction portion may store (or encode) transaction data. The transaction data may be associated with a transaction account, such as a credit, debit, stored value, or other account. For instance, the transaction data may comprise an account number. The transaction data may also comprise a BIN number (Bank Identification Number), e.g., for transaction routing purposes. For instance, the transaction storage medium may be a magnetic stripe of a typical credit, debit, or stored value card, and it may be encoded with a similar type of information (such as a card and/or account number).

The storage media 2, 4 may be used to store, obtain, transmit or otherwise handle any type of information, such as text, biometrics information (such as eyescan or fingerprint information) and so on.

The data from the activation and/or transaction storage media 2, 4 may be read by one or more merchant terminals (e.g., magnetic stripe readers at credit card terminals), an ATM-like reader or an older imprint-type reader. An example of the read-only encoded data on the stripes 2, 4 is data identifying the card user, bank identification number (and/or other routing code), and/or the category of the account to be charged upon using the transaction portion 14 (or activation portion 12).

Although the activation storage medium 2 and transaction storage medium 4 may be magnetic stripes having machine readable data stored therein, it will be understood that other storage media may be used, such as a barcode, RFID, optical read-only memory, other magnetic memory, smartcard chip, printed number or code, or any other means of printing or storing information that may be attached to (or otherwise on or associated with) a card.

Where the storage media include or consist of magnetic stripes, the composite card 1 may be swiped at merchant terminals so that the merchant terminal reads data from the activation and/or transaction magnetic stripes 2, 4. In some embodiments, the transaction storage medium 4 cannot be read by a traditional card reader until the activation portion 12 is separated from the transaction portion 14. For example, traditional magnetic stripe readers will read only a magnetic stripe that is adjacent an edge of the card being swiped. Thus, according to some embodiments, the card 1 may be configured so that the transaction magnetic stripe 4 is not adjacent an exposed edge unless the activation portion 12 of the card 1 has been removed. Once the activation portion 12 has been removed, the transaction magnetic stripe 4 of the transaction portion 14 can be swiped at merchant terminals like a traditional transaction card (e.g., a credit or debit card).

Either or both of the transaction portion 14 and the activation portion 12 may comprise any or all of the following features: account numbers, dotted account numbers, unidentified account numbers, security codes (e.g., a 3-digit security code typically found on the back of a credit card), signature lines, signatures, authorized users, effective dates, expiry dates, signature strips, full shielding foils, local shielding foils, card holes, color code matchings, feature embossing, dedicated feature imaging, ghosting, issuer names, issuer codes, bar codes, serial numbers, logos, emblems, artworks, advertisings, holographs, identification pictures, passwords, personal identification numbers (PINs), identification numbers, personal information, biometric information, finger prints, retinal prints, facial prints, facial information, voice prints, instructions, telephone numbers, addresses, and internet addresses, alone or in combination. Either or both of the transaction portion 14 and activation portion 12 may also comprise one or more electronic or radio frequency identification tags (not shown) alone or in combination affixed thereto. The electronic or radio frequency identification tag(s) my be identically encoded to at least one other identifier, such as one or more of the magnetic strips and/or card numbers.

It should be understood that while the terms "activation portion" and "transaction portion" are used herein to describe the two portions 12, 14 of the card 1, it is not necessary that the activation portion 12 have any activation function. Similarly, it not necessary that the transaction portion 14 have a transaction function. Instead, the activation portion 12 and transaction portion 14 may each have any one or more of a variety of functions, such as activating an account, transacting for value, adding value to an account, recharging an account, accessing account information, or any other financial-related function. The portions 12, 14 may have a similar or identical function.

FIG. 2 shows a side view of a composite card 1 according to an embodiment of the invention. As shown in FIG. 2, the activation portion 12 may be separable from the transaction portion 14 at a detachment joint 30. The activation portion 12 and the transaction portion 14 may be detachably joined in any suitable manner. In some embodiments, the activation portion 12 and the transaction portion 14 may be integrally formed into a single planar member of any suitable construction. In such embodiments, the detachment joint 30 may comprise a line of weakness that serves to facilitate separation of the two card portions such as by breaking, cutting, ripping or tearing. The line of weakness may be formed in any suitable manner known in the art including, by way of example, scoring or perforating the card member. In other embodiments, the activation portion 12 and the transaction portion 14 may be separately formed members that are detachably attached in one form or another. The detachment joint 30 in these embodiments may comprise any means of detachably coupling two objects together including, for example, a pressure sensitive adhesive.

In the embodiment shown in FIG. 2, the composite card 1 is formed as a laminate having a substrate 5, which includes both the activation portion 12 and the transaction portion 14. A transparent covering layer 7 may be applied to at least a portion of the upper surface of the substrate 5. The machine readable media 2, 4 may be attached to the base card 5 in a place where there is no covering 7 (as shown in FIG. 2), or they may be applied underneath or on top of a portion of the covering 7 (not shown).

FIG. 3 illustrates a front and back view of a composite card according to another embodiment of the invention. As shown in FIG. 3, the activation portion 12 may be coupled to the transaction portion 14 on the "bottom" edge of the transaction portion 14 (e.g., the edge opposite the edge to which the transaction portion 14 is attached in the embodiment of FIG. 1).

It will be understood that the card 1 and the activation and transaction portions 12, 14 may be of any convenient shape or dimension. By way of example, the transaction portion 14 may have the size, shape, and other physical characteristics of a credit card, debit card, phone card, other stored value card, or other transaction card. For instance, it may have the approximate (or exact) length, width, thickness, and physical makeup of a standard VISA/MasterCard/American Express/Discover credit or debit card, or an AT&T, MCI, or Bell Atlantic phone card. The physical card may comply with industry standards, such as ANSI/ISO 7811 and ANSI/ISO 7813 for financial transaction cards. The activation portion 12 may be smaller than the transaction portion 14, although it may otherwise have the same physical characteristics as the transaction portion 14. It may also be the same size as the transaction portion 14. Alternately, the activation portion 12 may have the physical characteristics (such as size and shape) of any other transaction card. Like the transaction portion 14, the activation portion 12 may be substantially rectangular like a regular transaction card, and it may have rounded edges. While a transaction portion 14 that is a typical transaction card in the industry is used by way of example herein, it should be appreciated that the transaction portion 14 need not be a standard card. For instance, it may have a different size and shape from typical credit cards, and it need not be a card.

FIG. 6 shows the composite card 1 of FIG. 1 after the activation portion 12 has been detached from the transaction portion 14. After detachment, the card may have a similar appearance to the detached components as shown in FIG. 6.

In the previously discussed embodiments, the machine readable media 2, 4 are positioned on the same side of the composite card 1. FIGS. 4 and 5 illustrate variations of the embodiments shown in FIGS. 1 and 3, respectively. FIG. 4 illustrates a front and back view of a composite card according to another embodiment of the invention. FIG. 5 illustrates another front and back view of a composite card according to another embodiment of the invention. In the embodiments of FIGS. 4 and 5, the machine readable media 2, 4 of the transaction portion 14 and activation portion 12 are on opposite sides of the card 1. As shown in these embodiments, the activation storage medium 2 is positioned on what may be considered a front face of the card 1, while the transaction storage medium 4 is on the opposite or rear face. It will be understood that the relative positions of the media 2, 4 may be reversed.

FIG. 7 illustrates a front and back view of a composite card according to another embodiment of the invention. In this embodiment, the activation portion 12 comprises a separate planar member removably attached to the front (or back) face of the transaction portion 14. The activation portion 12 may comprise, for example, a relatively thin layer adhesively applied to the transaction portion 14. Just as many typical credit cards are issued with a sticker attached to the card requesting to call a particular 800 number to activate the card, the card 1 may have a sticker comprising a magnetic stripe or other storage medium 2. The activation portion 12 may be attached to the transaction portion 14 so that a typical merchant terminal may be capable of reading a magnetic stripe 2 on the adhesive.

The activation portion 12 may be attached with, for example, a pressure sensitive adhesive so that the activation portion can be removed and discarded. For instance, a cardholder (or merchant) may rip off the activation portion 12 in a manner similar to ripping off a sticker. In some embodiments, the activation portion 12 may be affixed to the transaction portion 14 in a position so that the activation magnetic stripe 2 is remote from the transaction magnetic stripe 4 of the transaction portion 14. This way, merchants (or customers) may swipe either magnetic stripe 2, 4. Alternatively, the activation portion 12 may be positioned to cover the transaction magnetic stripe 4 so that the stripe 4 cannot be read at a merchant terminal until the activation portion 12 is removed.

The activation portion 12 may be attached so that the activation portion 12 is removable and reusable, e.g., can be removed and adhered again to the transaction portion 14 and/or to another surface, so that the activation portion 12 is removable but cannot be reattached to any surface, or so that the activation portion 12 is not removable (without damaging itself and/or rendering itself useless). The activation portion 12 may include any information, e.g., that is printed on the activation portion 12, and/or the activation portion 12 may obscure information on the transaction portion 14 from view. For example, the activation portion 12 may obscure a PIN number on the transaction portion 14 that is used to obtain prepaid telephone services and not be removable without detection.

Either or both of the storage media 2, 4 may be adapted so as to be readable by merchant terminals (e.g., existing merchant terminals used for credit card transactions) during transactions where cardholders use the card 1 to purchase goods and/or services from the merchants. For instance, cardholders may use the transaction portion 14 to purchase a product from a merchant at a merchant terminal. A merchant terminal may be any terminal equipped with an input apparatus for inputting card information, such as a magnetic stripe reader configured to read a magnetic stripe on a card, or a barcode reader or keypad. The merchant terminal may also be any merchant terminal configured to read transaction card data such as credit card data as known in the art.

Figure 8B:
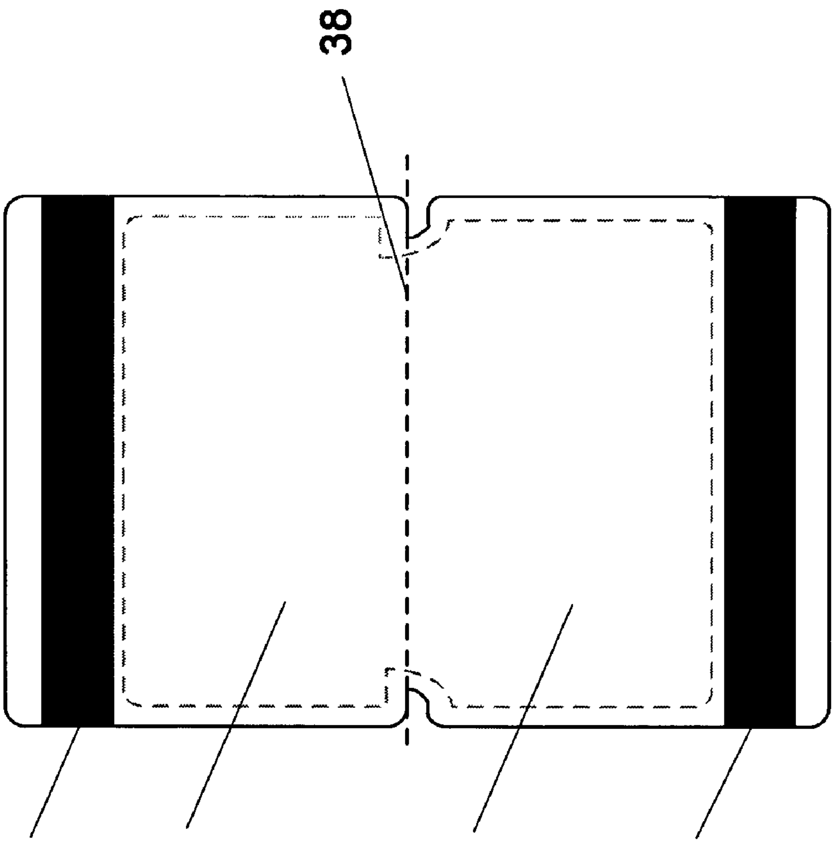
FIG. 8A and FIG. 8B illustrate a composite card according to an embodiment of the invention.
Figure 8A:
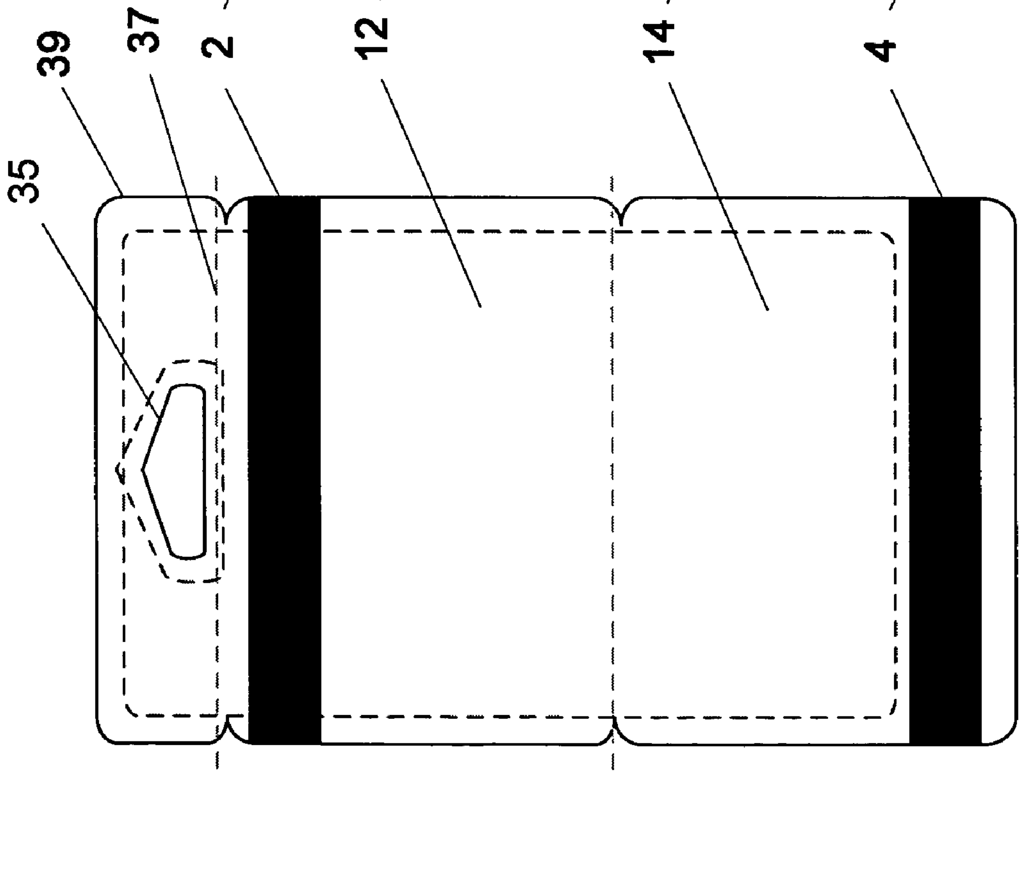

FIGS. 8A-8B illustrate a composite card according to an embodiment of the invention. FIG. 8A illustrates a j-hook portion 39 of the composite card which may comprise a j-hook hole 35 (aka a hang hole). As described above, the j-hook hole can be used for hanging the composite card 1 at a merchant display device, e.g., by inserting a display rod through the j-hook hole 35. In this way, the composite card 1 can hang from a hook (or other rod) on display for consumers. The j-hook portion 39 may be separable from the activation portion 12 at a j-hook score line, which may comprise any scoring or indentation or other means for enabling the separation of one portion of the composite card 1 from another. It should be appreciated that the j-hook portion 39 and/or the j-hook 35 may be attached to either the activation portion 12 (as shown in FIG. 8A) or the transaction portion 14 (not shown), or it may be attached to both along a side of the composite card 1 (e.g., sideways along the left side of the card in the diagram).

FIG. 8B shows the same composite card after the j-hook portion has been detached from the rest of the composite card. FIG. 8B also shows a card score line 37. The activation portion 12 and transaction portion 14 may be separable at the card score line 37.

Figure 9:
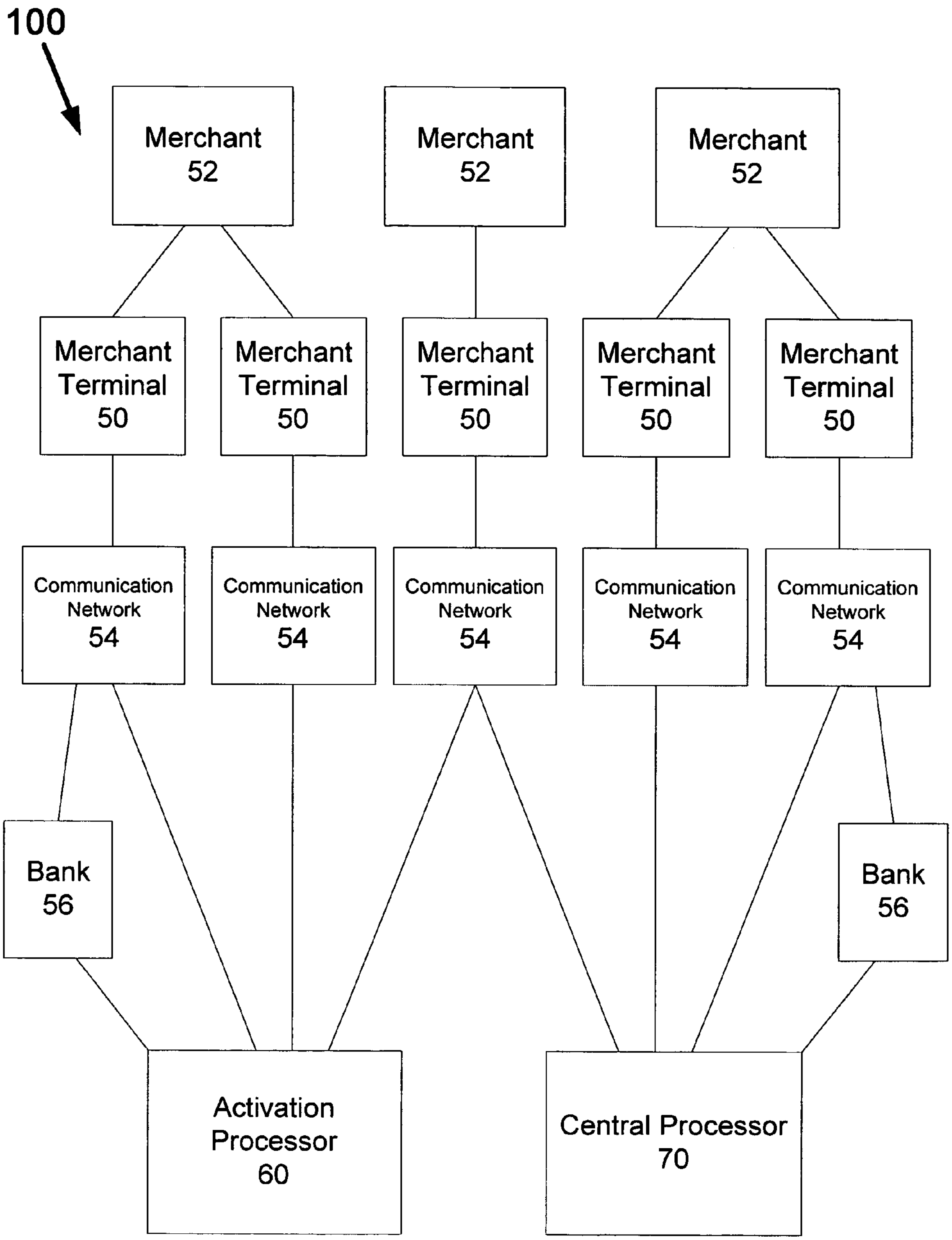
FIG. 9 shows a system for using the composite card according to another embodiment of the invention.

FIG. 9 shows a system 100 for processing composite cards according to an embodiment of the invention. The system 100 comprises one or more merchants 52, one or more merchant terminals 50, one or more communication networks 54, an activation processor 60, and a central processor 70. Each merchant 52 may have one or more merchant terminals 50, e.g., inside the merchant store. Each of the one or more merchant terminals 50 may be connected to an activation processor 60 and/or a transaction processor 70 and/or a bank 56 via one or more communication networks 54. Merchant terminals 50 from various merchants 52 may use the same communication network 54, and each terminal 50 may use more than one communication network 54.

The activation processor 60 and central processor 70 may be any server, computer, computer system, hub, database, data processor, bank, credit network, or other computer system, or any other processor. The activation processor 60 and central processor 70 may be configured to process data read from one or both machine readable media 2, 4 of any of the card embodiments described above.

The activation processor may be configured to activate the transaction portions of the composite cards of the invention. In some embodiments, the activation processor 60 activates the transaction portion after receiving activation data from a merchant terminal 50 via a communications network 54. For instance, a merchant terminal may swipe a magnetic stripe on an activation portion of a composite card, read activation data from the card, and pass the activation data to the activation processor.

In some embodiments, the central processor 70 processes transactions. For instance, the central processor may be a credit card or debit card processing system by which traditional credit card and debit card purchases are processed. The central processor may access accounts and transfer funds into or out of accounts to other accounts, such as merchant 52 accounts. Communication network 54 may comprise any communication device or network for communicating between a merchant terminal (or other card reading device) and a processor. Such technologies used to provide such communication might include a network, a dedicated circuit, IP based connection, the Internet, Intranet, Extranet, LAN, WAN, VPN, an Ethernet, or any client server system that provides communication, for example. Such communications technologies may use any suitable protocol such as TCP/IP, UDP, OSI, SNA, X.25, ISO 85/83, XML or SOAP, for example. The communication network may pass data between and among one or more banks 54, one or more activation processors 60, one or more central processors 70, and one or more merchant terminals 50.

It should be appreciated that the system 100 may also be used for host to host activation. For instance, card activation or transactions may occur over a merchant's private network 54 (e.g., a closed network) or at the terminal 50 itself rather than over an open network. Accordingly, in some embodiments the communications network 54 is a private merchant network, and the activation processor 60 and/or central processor 70 may be a merchant processor. The data communications may pass among different components in a single merchant store, or they may pass among a network of merchant stores to a centralized merchant processor 60, 70. Here, the activation processor 60 may also be the central processor 70.

Figure 10:
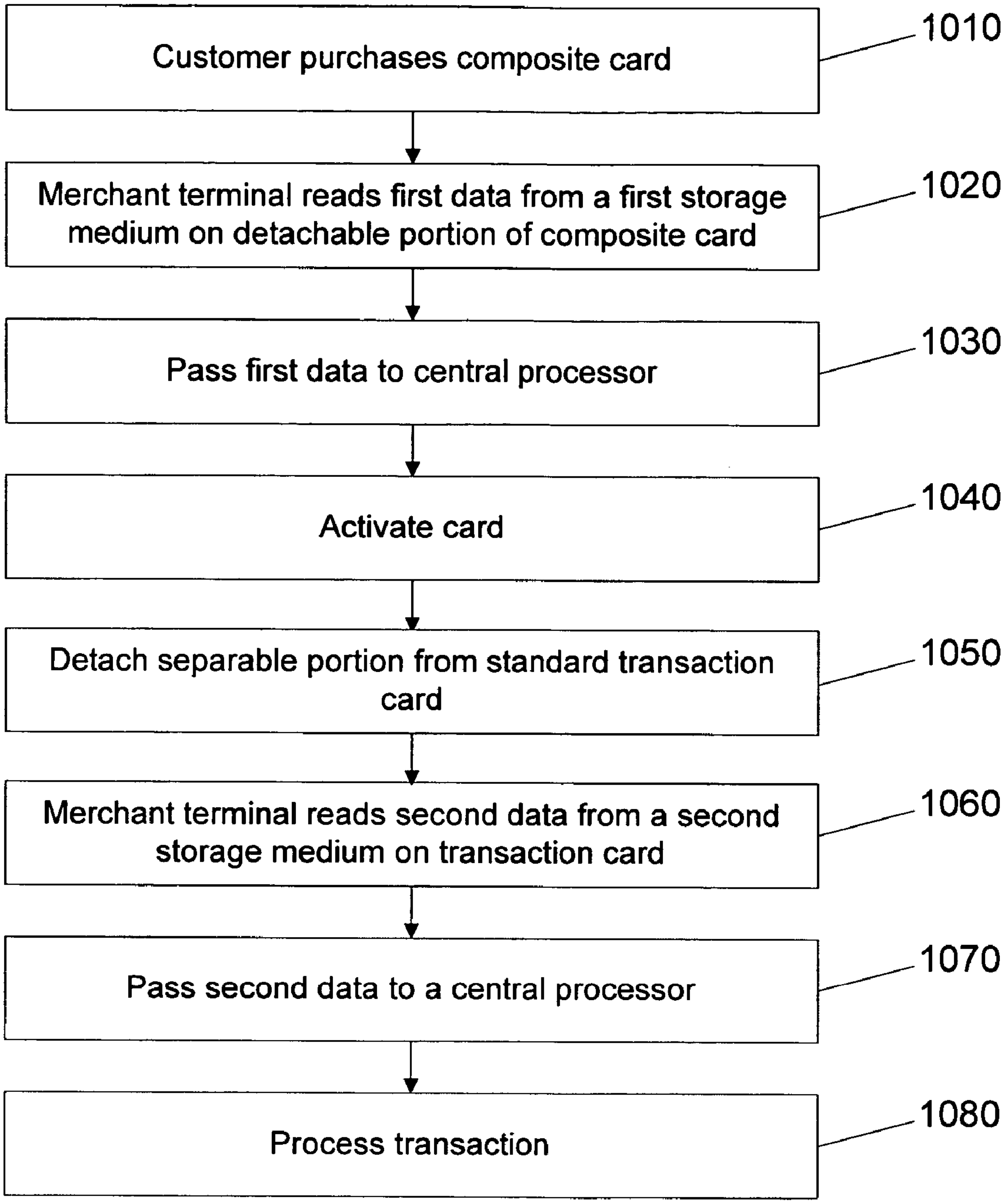
FIG. 10 shows a method of using a transaction card device according to another embodiment of the invention.

FIG. 10 shows a method of using a composite transaction card according to an embodiment of the invention. In step 1010, a customer purchases a composite card. The composite card may comprise any card as described herein and would have a transaction portion coupled to an activation portion. The activation portion may comprise an activation storage medium, and the transaction portion may comprise a transaction storage medium. Although the activation storage medium and transaction storage medium may be magnetic stripes having machine readable data stored therein, it will be understood that other storage media may be used, such as a barcode, RFID, optical read-only memory, other magnetic memory, smartcard chip, printed number or code, or any other means of printing or storing information that may be attached to (or otherwise on or associated with) a card.

At least one of the activation and transaction storage media may store information relating to an account associated with the composite card, such as a credit account, stored value account (e.g., a gift card account), debit account, or other account. Methods of storing information such as card account information on a magnetic stripe or other storage media are well-known in the art.

In some embodiments, the transaction storage medium may be usable to activate the card.

During a purchase transaction, the purchaser may add value to an account associated with the card. For instance, the purchaser may pay $50 to the point of sale merchant, and an account may create (or amend) an account associated with the card (e.g., the card number of the transaction portion) so that the account has a balance of $50 (or an additional $50, if the account already had funds).

It should be noted that the card need not be purchased over-the-counter. For instance, the card may be issued to a cardholder in the mail or otherwise provided to a cardholder (e.g., for free, or as a reward or rebate). In such an event, this step 1010 may not be necessary. Alternately, this step may comprise a purchase transaction wherein value is purchased and added to an account associated with the card. It should also be noted that in some embodiments, value may be added at later times throughout this process.

In step 1020, a merchant terminal reads activation data from the activation storage medium. The activation storage medium may be on an activation portion of a composite card. The activation storage medium may alternately (or in addition) be on a transaction portion, which may further comprise the transaction storage medium. The merchant terminal may be the same merchant terminal where the composite card was purchased.

The activation data may be read at a point of sale device, such as a magnetic card reader at a merchant terminal. This may occur during (or after) a purchase transaction or activation transaction. For instance, this step 1020 may occur during the action in step 1010, or it may occur during a subsequent transaction.

In step 1030, the activation data is passed to a processor, such as an activation processor (or a central processor). The data may be passed via a communication network. This step 1030 may occur as in a regular credit or debit card transaction, wherein data is read from the card (e.g., from the storage medium on the activation portion) and passed to a processor, such as a computer system of an issuing bank or other financial institution. The data may travel through a credit or debit card network, other financial transaction network, or other communication network.

The data may comprise a BIN number that enables a credit network to route the transaction to an appropriate bank in order to process the transaction. Alternately, the data may be transmitted over a private network (such as a WAN or LAN) to be processed by a central processor within the network. For instance, if a card is associated with a particular merchant, and the data is input at one of the particular merchant's terminals, then the data may processed at a central processor of the merchant.

In some embodiments, the activation portion may comprise a one-time use transaction card, e.g., a card associated with a one-time use transaction account or value. Thus, this step 1030 may comprise reading the storage medium on the activation portion during a transaction associated with the one-time use account or value. During the transaction, the value may be redeemed. In some embodiments, the transaction portion may not be activated until after the activation portion is used in the one-time use transaction. It should be noted that while a one-time use card is used as an example, the card may have other activation criteria, such as two-time use, a particular purchase amount threshold, or other criteria. For example, the transaction portion may not be activated for subsequent transactions until the activation portion is used twice in the month of July for purchases totaling $100. Once this condition is satisfied, the transaction portion may become activated for subsequent transactions, as discussed in step 1040.

In step 1040, the transaction card (i.e., the transaction portion of the card) may be activated or registered, e.g., automatically. The activation processor may have a database that stores card numbers or other data, and the central processor may amend the database to reflect that the particular card has been activated or registered (e.g., by amending a database entry corresponding to that card, as identified by the data). Alternately, the activation processor may request another entity to activate the card.

The activation step may enable the card (e.g., the transaction portion) to be used in subsequent merchant transactions. In some embodiments, one entity such as an issuer may activate the transaction card (e.g., by processing data read from the activation portion), and another entity (such as a specific merchant, or a bank) may process subsequent transactions after activation (e.g., by processing data received from the transaction portion). The issuer (or other entity) may process the activation by notifying the bank (or other entity) that the card was activated.

Upon activation, the transaction portion may effectively be valid as a regular credit, debit, or stored value card (such as a gift card valid only with a specific participating merchant and/or the specific merchant's partners). The card may be used in transactions over the Internet (or over the phone, or other transaction means).

The transaction card (i.e., the transaction portion of the composite card) may be any type of transaction card. For instance, it may be a one-time use card, and it may be a stored value card (e.g., a downloadable music card). The value associated with the card may depend on one or more prior transactions involving the activation portion. For instance, the transaction portion may be a downloadable music card with a value of songs (e.g., a number of songs) related to the total transaction amount associated with the activation portion. For instance, if $200 of value was purchased using the activation portion, then an account associated with the transaction portion may store credits for 20 songs to download.

In step 1050, the activation portion is separated from the transaction portion. For instance, the cardholder or merchant may detach (or break, rip, tear, cut, or otherwise separate) the activation portion immediately after the card is swiped in step 1030 (or at any other time, such as another time prior to step 1060, e.g., before step 1040). Depending on the embodiment, the cardholder may discard the activation portion and keep the transaction portion to use in future merchant transactions.

The transaction portion may then be used in subsequent transactions like a regular transaction card (e.g., a credit or debit card). For instance, the card may be used in transactions at merchant terminals and over the Internet.

In step 1060, a merchant terminal reads transaction data from the transaction portion. Reading data may occur in any manner as described in step 1020. For instance, a merchant terminal may read a magnetic stripe on the transaction portion. The data may be an account number or any other number or code. For instance, the data may be a card number and/or a BIN. The transaction data may be read during a regular transaction of the transaction portion.

This merchant terminal may be the same merchant terminal as the terminal used in step 1020, or it may be a different merchant terminal. The terminal may also be associated with a different merchant.

In some embodiments, the merchant is the same merchant that processes all transaction card transactions. For instance, if the card is associated with a specific merchant and valid only with the participating merchant (and/or partners thereof), the specific merchant may maintain the card account and process all card transactions (such as purchases from the merchant).

In step 1070, the transaction data is passed to a central processor, e.g., via a communication network. This step may occur in any manner described for step 1030. For instance, the magnetic stripe on the transaction portion may be swiped at a merchant terminal, which may read the data and pass it to a central processor via a communication network. The merchant terminal may pass the data to a bank and/or central processor.

In step 1080, a transaction is processed. A cardholder may use the transaction portion (e.g., a credit or debit card) to make a purchase or payment from a merchant at a merchant terminal (or via the Internet or other transaction means). Funds may be transferred to or from a bank account, e.g., at the direction of the central processor. For instance, funds may be transferred from an account associated with the transaction card, such as a credit or debit account, to a merchant account or other account.

After the process described in FIG. 10 has been carried out, one or more subsequent transactions may be processed by reading the transaction data from the activation storage medium at one or more merchant terminals. This step may involve reading the transaction data at one or more merchant terminals (e.g., the same or different terminal as that used in step 1060 and/or step 1020).

It should be noted that instead of reading data from the card at a merchant terminal (e.g., in steps 1020 and 1060), card data can be input over the Internet. For instance, there may be an account number associated with the activation portion and another number associated with the transaction portion. For instance, the numbers may be printed on the card. Instead of passing the data (e.g., the numbers) to a processor from the merchant terminal, they may be entered directly at a website, e.g., a website associated with the processor.

It should also be noted that the transaction portion may be any standard transaction card, such as a credit card, debit card, or stored value card. A stored value card may be used to access one or more products or services, such as prepaid products or services, and it may be enabled by a PIN. Examples of services that may be accommodated by or accessed by stored value cards include: long distance telephone communication, wireless communication, paging and internet-enabled communication services, including wireless web access, emergency road service, legal service, accounting service, tax service, property cleaning and/or maintenance service, clothe/garment cleaning service, transportation service, travel service, delivery service, online (or off-line) dating service, electrical and/or gas service, water service, sewage service, internet access, and film processing (including digital film processing). Other examples of prepaid services and/or products that may be accessed by a stored value card include gift accounts, prepaid gas accounts, prepaid grocery accounts, prepaid entertainment accounts, prepaid movie accounts, downloadable ring tone accounts, downloadable game accounts, downloadable movie accounts, downloadable music accounts that use MP3, MP4, WMV, WAV, or other music formats, any other downloadable software account, customer rewards accounts, bridge and/or road toll accounts, and any other type of PIN-enabled stored value accounts for products, services, or both, that may be prepaid by the owner of the account.

Figure 11:
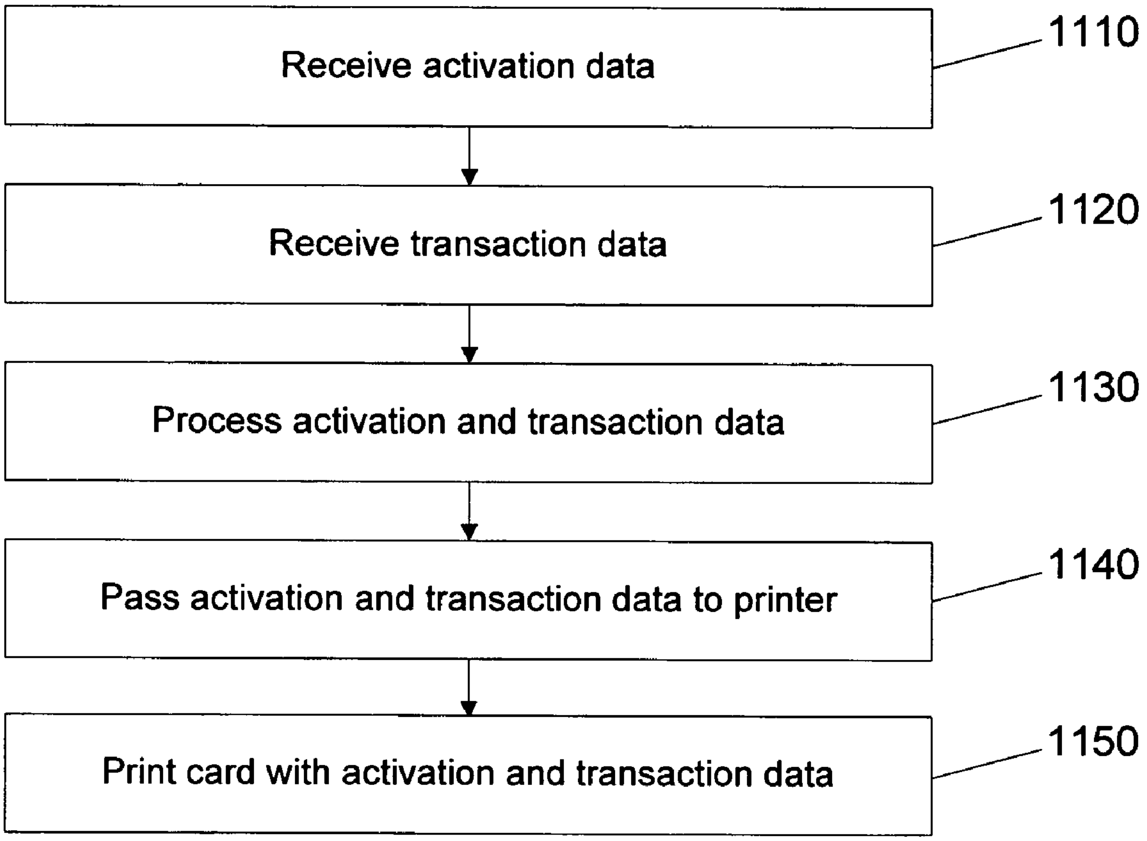
FIG. 11 shows a method of encoding a composite transaction card according to an embodiment of the invention.

FIG. 11 shows a method of encoding a composite transaction card according to an embodiment of the invention.

In step 1110, activation data is received. For instance, a central processor may receive activation data from a merchant associated with a composite transaction card.

In step 1120, transaction data is received. For instance, a central processor may receive transaction data from a merchant associated with a composite transaction card. This step may occur before, after, or during step 1110.

As described above, the activation and transaction data may comprise an account number, code, instruction, or any other data. It may be any type of data that may be stored on a card, e.g., in a barcode, magnetic stripe, or other storage device on a card. The data may also comprise any information that may be printed on a card, such as a merchant or cardholder name.

In some embodiments, the data is received from merchants affiliated with the activation and/or transactions associated with the card. For instance, one type of stored value card may be activated by a particular card retailer and then used only with a specific toy merchant. Thus, the central processor may receive activation data from the card retailer and transaction data from the toy merchant.

In step 1130, the activation and transaction data is processed. For instance, activation data for a specific card may be stored in a record in a database, and transaction data for the same specific card may be stored in the same database record. Activation and transaction data for a specific card (or for a set of cards) may accordingly be merged and/or otherwise associated with each other. The activation data need not be processed at the same time as the transaction data, and one or the other may be processed immediately after it is received in steps 1110 and 1120.

In step 1140, the activation and transaction data may be passed to an encoding machine or printer. The printer (or encoding machine) may comprise any entity that prints, encodes, or stores data in or on storage media of a transaction card, or that otherwise fabricates all or a portion of a transaction card. For instance, a printer may be an entity that encodes the magnetic stripes (or other storage media) of credit cards or other transaction cards that have one or more magnetic stripes.

In step 1150, a card is encoded or otherwise printed with activation data, transaction data, and/or other data. For instance, the transaction data may be encoded on one storage medium such as a magnetic stripe, and the activation data may be encoded on another magnetic stripe. The encoding of the activation and transaction data may occur at substantially (or exactly) the same time and/or during the same printing cycle. During the encoding, the card may be printed. Printing may comprise writing indicia onto the card, embossing a name and/or card number, drawing logos or other designs (e.g., designs or indicia associated with a card issuer, card sponsor, credit network, or other entity associated with a card), laminating the card, adding stickers, and otherwise altering the card to convert it from a plain piece of plastic into a consumer-grade composite transaction card (e.g., as shown in FIG. 1).

Thus, in step 1150 the composite card may be encoded with transaction data on one storage medium and may also be encoded with activation data on another storage medium at substantially the same time. Printing may also occur at substantially the same time. This step 1150 accordingly enables a composite card to be encoded and/or printed in one pass, thereby saving time and expense. This facilitates the printing of a large number of cards, since a card having two storage media only need be run through an encoding and/or printing machine a total of once time (rather than twice, or once for each storage medium).

The embodiments of the present inventions are not to be limited in scope by the specific embodiments described herein. Indeed, numerous variations, changes, substitutions and equivalents will be apparent to those skilled in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, it is intended that all subject matter described herein and shown in the accompanying drawings be regarded as illustrative only and not in a limiting sense and that the scope of the invention be solely determined by the appended claims. Also, the claims set forth below should be construed in view of the full breadth and spirit of the embodiments of the present inventions as disclosed herein.

What is claimed is:

1. A composite transaction card comprising:

a transaction portion comprising a substantially planar transaction portion substrate having a machine readable transaction storage medium applied thereto, the transaction storage medium being a first magnetic stripe having transaction card data associated with an account stored therein; and an activation portion coplanar with the transaction portion and detachably coupled to the transaction portion, the activation portion comprising a substantially planar activation portion substrate having a machine readable activation storage medium applied thereto, the activation storage medium having activation data associated with the account stored therein; and wherein the transaction portion can only be read by a traditional magnetic stripe reader after the activation portion is separated from the transaction portion.

2. The composite transaction card of claim 1, wherein the transaction and activation storage media are readable at one or more merchant terminals.

3. The composite transaction card of claim 1, wherein the account is a stored value account.

4. The composite transaction card of claim 1, wherein the account is at least one of a debit account and a gift card account.

5. The composite transaction card of claim 1, wherein the activation storage medium is a second magnetic stripe.

6. The composite transaction card of claim 1, wherein the activation storage media is a bar code.

7. The composite transaction card of claim 1, wherein the activation data comprises an account number associated with the account, and the account number is printed on the transaction portion.

8. The composite transaction card of claim 1, wherein the activation and transaction storage media have formatting and physical characteristics that are substantially similar to the magnetic stripe on a traditional credit card.

9. The composite transaction card of claim 1, wherein the activation storage medium and transaction storage medium are magnetic stripes, wherein the magnetic stripes are parallel to a length dimension of the composite card and extend at least substantially across the length of the composite card.

10. The composite transaction card of claim 1, wherein the transaction and activation storage media are magnetic stripes having a substantially similar length and width.

11. The composite transaction card of claim 1, wherein the activation data comprises transaction card data.

12. The composite transaction card of claim 1, wherein the transaction card data comprises activation data.

13. The composite transaction card of claim 1, wherein the activation portion and the transaction portion are integrally formed as a single planar member and the activation portion is separable from the transaction portion along a detachment joint.

14. The composite transaction card of claim 13, wherein the detachment joint comprises a line of weakness formed by perforating or scoring the integral planar member.

15. The composite transaction card of claim 1, wherein the activation portion and the transaction portion comprise substantially similar substrates.

16. The composite transaction card of claim 1, wherein the transaction portion is a debit card.

17. The composite transaction card of claim 1, wherein the transaction portion is a credit card.

18. The composite transaction card of claim 1, wherein the transaction portion is a stored value card.

19. The composite transaction card of claim 1, wherein the transaction portion is a gift card.

20. The composite transaction card of claim 1, wherein the transaction portion is a gift card associated with a specific merchant.

21. The composite transaction card of claim 1, wherein the transaction portion and the activation portion are each formed as a substantially planar member and the activation portion is detachably coupled to the transaction portion via an adhesive.

22. The composite transaction card of claim 21, wherein the transaction portion is a standard transaction card.

23. The composite transaction card of claim 1, wherein the activation and transaction storage media can be read at one or more merchant terminals.

24. The composite transaction card of claim 23, wherein the transaction card data is configured for accessing an associated stored value account, and wherein the activation data is operative to activate the account.

25. The composite transaction card of claim 23, wherein the transaction card data is operative to recharge the account.

26. The composite transaction card of claim 23, wherein the transaction card data is operative to purchase products and services at merchant terminals.

27. A method of using a composite transaction card having a transaction portion including a machine readable transaction storage medium and detachable coplanar activation portion including a machine readable activation storage medium, the transaction storage medium is a magnetic stripe having transaction card data associated with an account stored therein, the activation storage medium having activation data associated with the account stored therein, the method comprising:

reading the activation data from the activation storage medium at a first merchant terminal;

detaching the coplanar activation portion from the transaction portion; and reading the transaction data from the transaction storage medium at a second merchant terminal, wherein the step of reading the transaction data may be carried out only after the detaching step has been carried out.

28. The method of claim 27, further comprising passing activation data to an activation processor.

29. The method of claim 27, further comprising passing transaction card data to a central processor.

30. A system for processing a composite transaction card having a transaction portion including a machine readable transaction storage medium and detachable activation portion including a machine readable activation storage medium, the transaction portion and the activation portion being coplanar, the transaction storage medium being a magnetic stripe and having transaction card data associated with an account stored therein the activation storage medium having activation data associated with the account stored therein, the system comprising:

at least one merchant terminal for reading the activation data from the activation storage medium and for reading transaction card data from the transaction storage medium, wherein the transaction card data can only be read by a traditional magnetic stripe reader after the activation portion is separated from the transaction portion;

an activation processor for receiving activation data from the at least one merchant terminal and activating a transaction account associated with the transaction card data; and a transaction processor for receiving and processing transaction data from the at least one merchant terminal.

31. A method of using a transaction card device, comprising:

receiving activation account information from an activation portion of a transaction card during a first transaction associated with an activation account, wherein the transaction card comprises a transaction portion coplanar with and coupled to the activation portion, the transaction portion comprising a substantially planar transaction portion substrate having a machine readable transaction storage medium applied thereto, the transaction storage medium being a magnetic stripe, the transaction storage medium having transaction card data associated with a transaction account stored therein, the activation portion detachably coupled to the transaction portion, the activation portion comprising a substantially planar activation portion substrate having a machine readable activation storage medium applied thereto;

based on the first transaction, adding value to the transaction account; and receiving the transaction card data from the transaction portion during a second transaction, wherein the step of receiving the transaction card data from the transaction portion may be carried out only after the activation portion is separated from the transaction portion.

32. The method of claim 31, further comprising:

redeeming the added value of the transaction account during the second transaction.

33. The method of claim 31, wherein the activation account is the transaction account.

* * * * *